US012741877B2

(12) United States Patent
Zhang et al.

(10) Patent No.: US 12,741,877 B2
(45) Date of Patent: Sep. 22, 2026

(54) HIERARCHICAL POROUS ZSM-5 MOLECULAR SIEVE, PREPARATION METHOD THEREFOR, HZSM-5 MOLECULAR SIEVE PREPARED THEREFROM, AND USE OF MOLECULAR SIEVE

(71) Applicant: SSI NEW MATERIAL (ZHENJIANG) CO., LTD., Zhenjiang (CN)

(72) Inventors: Lei Zhang, Zhenjiang (CN); Mingbo Guo, Zhenjiang (CN); Yuanhong Ma, Zhenjiang (CN); Chang Gong, Zhenjiang (CN)

(73) Assignee: SSI New Material (Zhenjiang) Co., Ltd., Zhenjiang (CN)

( * ) Notice: Subject to any disclaimer, the term of this patent is extended or adjusted under 35 U.S.C. 154(b) by 994 days.

(21) Appl. No.: 17/757,838

(22) PCT Filed: Dec. 24, 2020

(86) PCT No.: PCT/CN2020/138907
§ 371 (c)(1),
(2) Date: Jun. 22, 2022

(87) PCT Pub. No.: WO2021/129719
PCT Pub. Date: Jul. 1, 2021

(65) Prior Publication Data

US 2023/0045179 A1 Feb. 9, 2023

(30) Foreign Application Priority Data

Dec. 26, 2019 (CN) ........................ 201911370231.0

(51) Int. Cl.
*C01B 39/40* (2006.01)
*G10K 11/162* (2006.01)
*H04R 1/28* (2006.01)

(52) U.S. Cl.
CPC ............ *C01B 39/40* (2013.01); *G10K 11/162* (2013.01); *H04R 1/288* (2013.01);
(Continued)

(58) Field of Classification Search
CPC .. H04R 1/288; C01P 2002/72; C01P 2004/03; C01P 2004/61; C01P 2004/62;
(Continued)

(56) References Cited

U.S. PATENT DOCUMENTS 9,099,073 B2 * 8/2015 Papakyriacou ...... H04R 1/2803
10,343,926 B1 7/2019 Wang et al.
(Continued)

FOREIGN PATENT DOCUMENTS

CN 106888423 A 6/2017
CN 107265477 A 10/2017
(Continued)

OTHER PUBLICATIONS

First Office Action Report issued on Mar. 28, 2023 for counterpart Chinese patent application No. 201911370231.0.
(Continued)

*Primary Examiner* — Christina A Johnson
(74) *Attorney, Agent, or Firm* — Hoffman Warnick LLC

(57) ABSTRACT

The present invention provides a hierarchical porous ZSM-5 molecular sieve. The hierarchical porous ZSM-5 molecular sieve comprises micropores having a pore size of 0.5-1.8 nm and mesopores having a pore size of 4-30 nm, and has a particle size of 0.3-4 μm, which is obtained by using hemicellulose as a hard template agent.

8 Claims, 3 Drawing Sheets

(52) U.S. Cl.
CPC ...... *C01P 2002/72* (2013.01); *C01P 2004/03* (2013.01); *C01P 2004/61* (2013.01); *C01P 2004/62* (2013.01); *C01P 2006/14* (2013.01); *C01P 2006/16* (2013.01)

(58) Field of Classification Search
CPC ... C01P 2006/14; C01P 2006/16; C01B 39/38
See application file for complete search history.

(56) References Cited

U.S. PATENT DOCUMENTS

| | | | |
|---|---|---|---|
| 2018/0167721 | A1 | 6/2018 | Feng |
| 2019/0202706 | A1 | 7/2019 | Tang et al. |

FOREIGN PATENT DOCUMENTS

| | | | |
|---|---|---|---|
| CN | 107459047 | A | 12/2017 |
| CN | 107840348 | A | 3/2018 |
| CN | 108275696 | A | 7/2018 |
| CN | 108658093 | A | 10/2018 |
| CN | 109368657 | A | 2/2019 |
| CN | 109801616 | A | 5/2019 |
| CN | 110040741 | A | 7/2019 |
| CN | 110317083 | A | 10/2019 |
| CN | 110330029 | A | 10/2019 |
| EP | 2495991 | A1 | 9/2012 |
| KR | 20180107364 | A | 10/2018 |

OTHER PUBLICATIONS

Search Report issued on Mar. 28, 2023 for counterpart Chinese patent application No. 201911370231.0.

Extended European Search Report issued on Jun. 3, 2024 for counterpart European patent application No. 20907999.5.

Jia Chengfei et al., "Synthesis and scale-up of ZSM-5 aggregates with hierarchical structure," Research on Chemical Intermediates, Amsterdam, NL, vol. 45, No. 7, Apr. 25, 2019.

Teng Xue et al., "Seed-induced synthesis of mesoporous ZSM-5 aggregates using tetrapropylammonium hydroxide as single template," Microporous and Mesopprous Materials, Elsevier, Amsterdam, NL, vol. 156, Feb. 13, 2012.

Li Chao et al., "A hemicellulose modified HZSM-5 and their application in the light olefins oligomerization to high-quality liquid fuels reaction," Catalysis Communications, vol. 102, Dec. 1, 2017.

Decision of Rejection issued on Nov. 30, 2023 for counterpart Chinese patent application No. 201911370231.0, 13 pages.

Second Office Action Report issued on Jun. 13, 2023 for counterpart Chinese patent application No. 201911370231.0.

PCT International Search Report for International Application No. PCT/CN2020/138907, dated Mar. 26, 2021, 7 pages.

First Office Action issued on Jun. 10, 2025 for counterpart Korean patent application No. 10-2022-7020245.

* cited by examiner

HIERARCHICAL POROUS ZSM-5 MOLECULAR SIEVE, PREPARATION METHOD THEREFOR, HZSM-5 MOLECULAR SIEVE PREPARED THEREFROM, AND USE OF MOLECULAR SIEVE

FIELD OF TECHNOLOGY

The present invention belongs to the technical field of molecular sieve, and specifically relates to a hierarchical porous ZSM-5 molecular sieve and preparation method and application thereof.

BACKGROUND ART

With the development of science and technology and the improvement of people's living standards, the demand for electronic consumer goods is increasing, especially in the field of mobile phones. As the mobile phones becomes thinner and thinner, the requirements for components such as screens and cameras are getting higher, leaving a gradually reduced space for a loudspeaker. The loudspeaker is required to provide the excellent acoustic performance as usual while minimizing the possible volume. At present, the sound quality of the loudspeaker is mainly related to the design and manufacture thereof, especially the current back cavity design of the loudspeaker. Under normal circumstances, the smaller the back cavity, the worse the response in the low frequency band, and the worse the acoustic performance, such as sound quality. Therefore, the premise of improving the sound quality is to increase the volume of the back cavity. Currently, the virtual volume of the back cavity is increased mainly by filling the back cavity with sound-absorbing materials such as activated carbon, silica, molecular sieve, and high-phosphorus soil, which improves the gas compliance of the back cavity, thereby improving the low-frequency response. At present, high-silicon molecular sieves have significant contribution to the sound improvement, as described in the patent EP2495991.

The currently used molecular sieve sound-absorbing material is mainly of a microporous structure. However, during use, there are a large number of volatile organic compounds (VOCs) in the environment, which will block the micropores of the molecular sieve after being adsorbed by the sound-absorbing particles, leading to reduction or failure in the acoustic performance of the sound-absorbing particles.

In view of such problems, it is necessary to develop a new type of molecular sieve and sound-absorbing material, which can effectively avoid or reduce the impact of VOCs on the material and improve the acoustic stability.

SUMMARY OF THE INVENTION

In view of the above problems, the present invention has a first object of providing a hierarchical porous ZSM-5 molecular sieve; a second object of providing a production method of the hierarchical porous ZSM-5 molecular sieve; a third object of providing a hierarchical porous HZSM-5 molecular sieve; a fourth object of providing use of the hierarchical porous ZSM-5 molecular sieve or the hierarchical porous HZSM-5 molecular sieve in the production of a sound-absorbing material; a fifth object providing a hierarchical porous molecular sieve sound-absorbing material; a sixth object of providing a loudspeaker comprising the hierarchical porous molecular sieve sound-absorbing material. The hierarchical porous ZSM-5 molecular sieve of the present invention can effectively prevent the gas of VOCs from clogging the molecular sieve pores, and significantly improve the long-term stability of the sound-absorbing material in the use of loudspeaker.

The above objects of the present invention are achieved through the following technical means.

In an aspect, the present invention provides a hierarchical porous ZSM-5 molecular sieve, comprising micropores having a pore size of 0.5-1.8 nm and mesopores having a pore size of 4-30 nm, and the molecular sieve having a particle size of 0.3-4 μm;

wherein the hierarchical porous ZSM-5 molecular sieve has a total pore volume of 0.23-0.26 ml/g, and wherein the micropores have a pore volume of 0.12-0.16 ml/g.

In the above hierarchical porous ZSM-5 molecular sieve, preferably, the micropores have a pore size of 0.6-1.5 nm, the mesopores have a pore size of 10-28 nm, and the hierarchical porous ZSM-5 molecular sieve has a particle size of 0.7-3 μm.

In the above hierarchical porous ZSM-5 molecular sieve, preferably, the micropores have a pore size of 0.7-1.4 nm, the mesopores have a pore size of 15-25 nm, and the hierarchical porous ZSM-5 molecular sieve has a particle size of 1-2 μm.

In another aspect, the present invention provides a method for producing the above hierarchical porous ZSM-5 molecular sieve, comprising:

- dissolving a silicon source, an aluminum source and an organic template agent in water, adjusting the pH to 8-12 with an inorganic base, and stirring it well to form a gel; and
- adding hemicellulose into the gel and mixing it well, followed by aging at an elevated temperature, and then transferring it to a reaction kettle for crystallization; thereafter, subjecting the resultant to washing, drying and calcination to remove the organic template agent and the hemicellulose, to obtain the hierarchical porous ZSM-5 molecular sieve.

In the above method, preferably, the silicon source comprises one of silica gel, silicic acid, ethyl orthosilicate, sodium silicate, and sodium metasilicate, or any combination thereof.

In the above method, preferably, the silicon source comprises ethyl orthosilicate and/or silica gel.

In the above method, preferably, the aluminum source comprises one of aluminum nitrate, aluminum sulfate, aluminum chloride, and aluminum isopropoxide, or any combination thereof.

In the above method, preferably, the aluminum source comprises aluminum isopropoxide and/or aluminum nitrate.

In the above method, preferably, the organic template agent comprises one of tetrapropylammonium hydroxide, tetrapropylammonium bromide, tetrapropylammonium chloride, tetramethylammonium hydroxide and tetraethylammonium hydroxide, or any combination thereof.

In the above method, preferably, the organic template agent comprises tetrapropylammonium hydroxide and/or tetrapropylammonium bromide.

In the above method, preferably, the inorganic base comprises one of sodium hydroxide, potassium hydroxide and aqueous ammonia, or any combination thereof.

In the above method, preferably, the inorganic base is sodium hydroxide.

In the above method, preferably, the molar ratio of the silicon source, the aluminum source, the organic template agent, the inorganic base and the water is 100:(0.15-1):(7-20):(5-10):(500-1000).

The silicon source is based on the molar amount of silicon dioxide, and each of the aluminum source, the organic template agent, the inorganic base and the water is based on the molar amount of the raw material itself.

In the above method, preferably, the mass ratio of the gel to the hemicellulose is (50-100):1.5.

In the above method, preferably, the aging at an elevated temperature is performed at a temperature of 60° C.-98° C. for 2-4 h.

In the above method, preferably, the crystallization is performed at a temperature of 120° C.-200° C. for 36-72 h.

In the above method, preferably, the calcination is performed at a temperature of 500° C.-600° C. for 4-12 h.

In a further aspect, the present invention provides a hierarchical porous HZSM-5 molecular sieve obtained by subjecting the above hierarchical porous ZSM-5 molecular sieve to an ion exchange in a $NH_4Cl$ solution and drying and calcining the product.

In the above hierarchical porous HZSM-5 molecular sieve, preferably, the $NH_4Cl$ solution has a concentration of 1-2 mol/L.

In the above hierarchical porous HZSM-5 molecular sieve, preferably, the ion exchange is repeated 1-3 times, preferably 3 times, and for 3-6 h, preferably 6 h each time.

In the above hierarchical porous HZSM-5 molecular sieve, preferably, 5-10 g of the hierarchical porous ZSM-5 molecular sieve is used per 100 ml of the $NH_4Cl$ solution; preferably, 10 g of the hierarchical porous ZSM-5 molecular sieve is used per 100 ml of the $NH_4Cl$ solution.

In the above hierarchical porous HZSM-5 molecular sieve, preferably, the ion exchange is performed at a temperature of 60° C.-100° C., preferably 90° C.

In the above hierarchical porous HZSM-5 molecular sieve, preferably, the calcination after the ion exchange is performed at a temperature of 500° C.-600° C. for 3-6 h.

In yet a further aspect, the present invention provides use of the above hierarchical porous ZSM-5 molecular sieve or the above hierarchical porous HZSM-5 molecular sieve in the production of a sound-absorbing material.

In yet a further aspect, the present invention provides a hierarchical porous molecular sieve sound-absorbing material obtained by uniformly mixing the above hierarchical porous ZSM-5 molecular sieve or the above hierarchical porous HZSM-5 molecular sieve with solvent(s), adhesive(s) and aid(s) to prepare a suspension, followed by granulating and drying to form spherical particles.

In the above hierarchical porous molecular sieve sound-absorbing material, preferably, the adhesive(s) comprise inorganic adhesive(s) and/or organic polymer adhesive(s).

In the above hierarchical porous molecular sieve sound-absorbing material, preferably, the hierarchical porous molecular sieve sound-absorbing material has a particle size of 50-600 μm, preferably 200-500 μm, more preferably 250-480 μm.

In yet a further aspect, the present invention provides a loudspeaker comprising a back cavity loaded with the above hierarchical porous molecular sieve sound-absorbing material.

In the present invention, hemicellulose is used as a hard template agent to prepare a hierarchical porous ZSM-5 molecular sieve. Thus, the synthesized molecular sieves have both ordered micropores and mesopores, forming more pore structures of different sizes, without the introduction of complex processes. After the molecular sieve is made into sound-absorbing particles, the adsorption and desorption performance of air molecules can be effectively improved, thereby improving the low-frequency response of the loudspeaker, and thus enhancing its acoustic performance. Meanwhile, the pore structure of different sizes can more efficiently and selectively adsorb volatile organic compounds (VOCs) in the environment, thereby improving the stability of the sound-absorbing particles in improving the acoustic performance of the loudspeaker.

DETAILED DESCRIPTION OF PREFERRED EMBODIMENTS

In order to have a clearer understanding of the technical features, purposes and beneficial effects of the present invention, the technical solutions of the present invention are now described in detail below, which, however, should not be construed as limiting the scope of implementation of the present invention.

Example 1

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 8.35 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 180° C. for 72 h.

Figure 1:
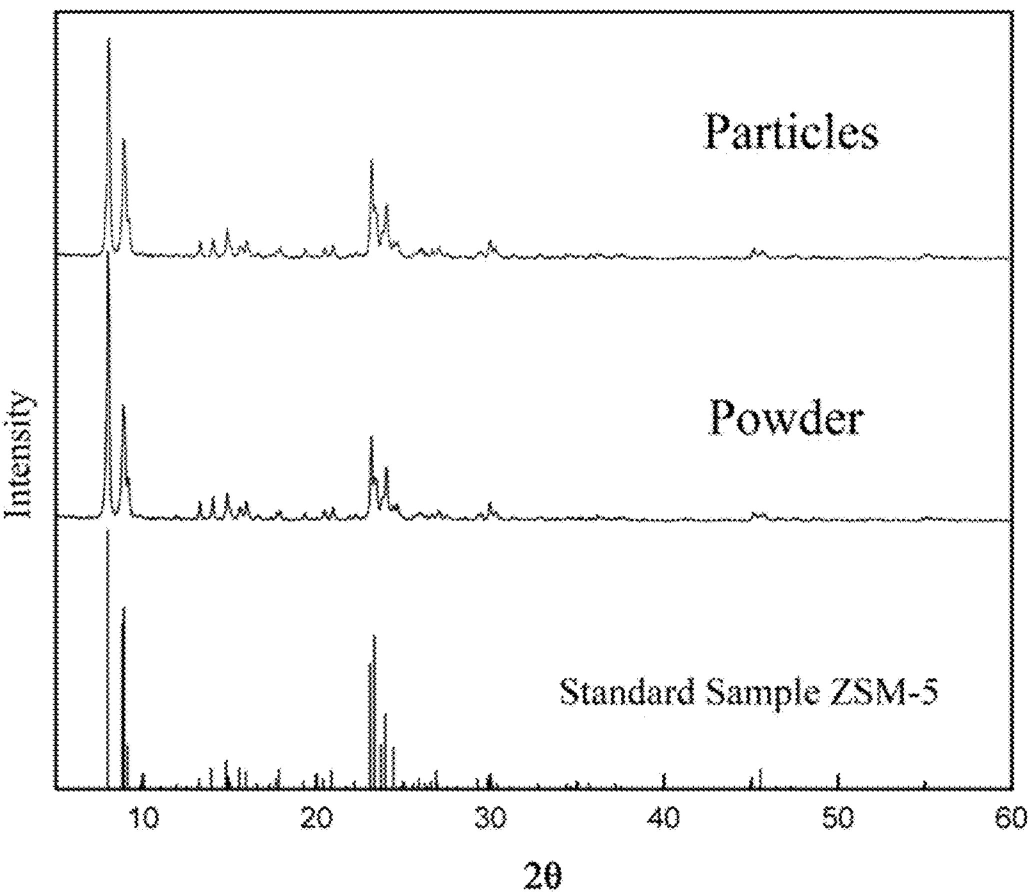
FIG. 1 is an XRD pattern of the hierarchical porous HZSM-5 molecular sieve synthesized in Example 1 of the present invention.
Figure 2:
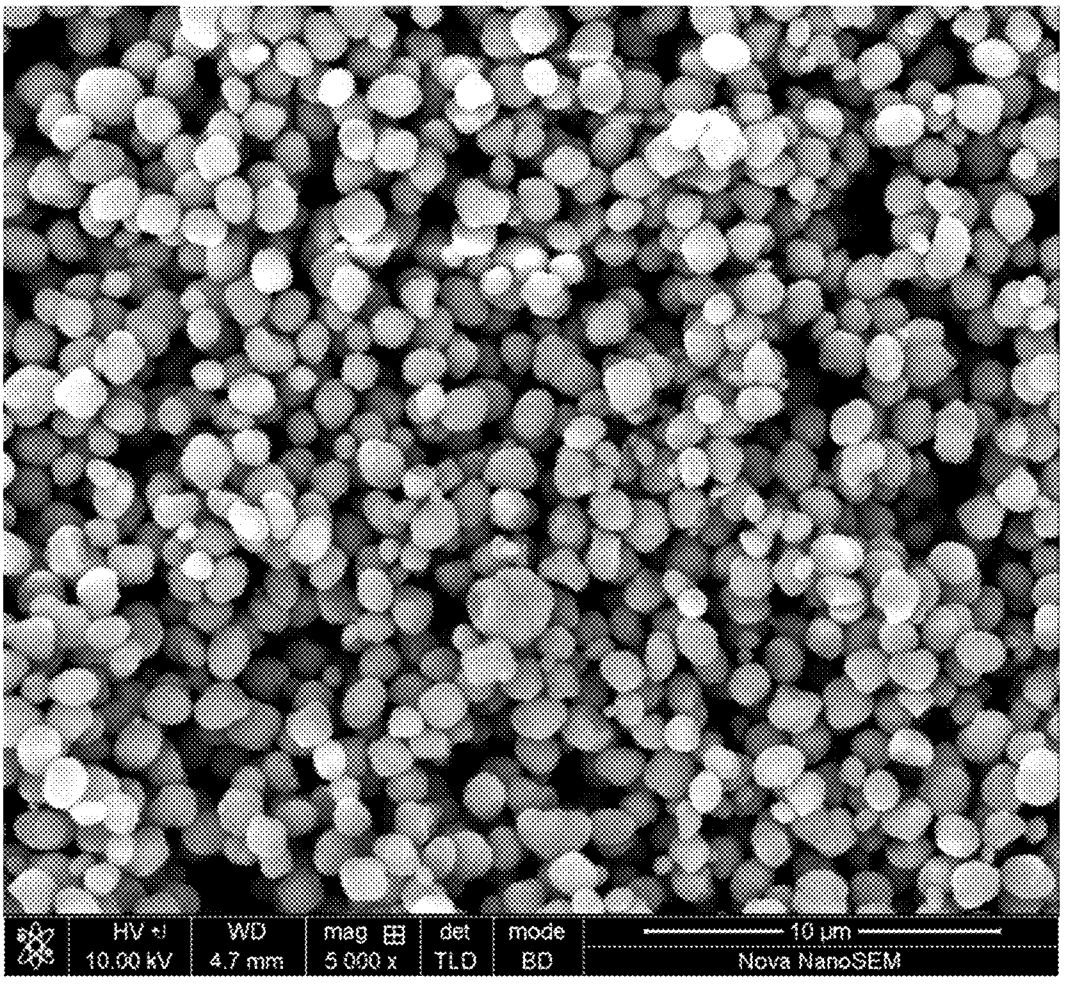
FIG. 2 is a SEM image of the hierarchical porous HZSM-5 molecular sieve synthesized in Example 1 of the present invention.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve, of which the XRD pattern is shown in FIG. 1, and the SEM image is shown in FIG. 2.

Example 2

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 72 g of silica gel (30% content), 8.35 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 3

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 72 g of silica gel (30% content), 8.35 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 150° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 4

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 105 g of silica gel (30% content), 8.35 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 150° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange three times, the product was filtered, washed, dried, and calcined at 550° C. for 4 h, to obtain the hierarchical porous HZSM-5 molecular sieve.

Example 5

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 105 g of silica gel (30% content), 8.35 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange three times, the product was filtered, washed, dried, and calcined at 550° C. for 4 h, to obtain the hierarchical porous HZSM-5 molecular sieve.

Comparative Example 1

This comparative example provides a ZSM-5 molecular sieve and HZSM-5 molecular sieve and a production method thereof. The production method of the ZSM-5 molecular sieve and the HZSM-5 molecular sieve comprises the following steps.

Under stirring, 0.5 g of aluminum nitrate nonahydrate, 70 g of deionized water, 72 g of silica sol, and 9.56 g of tetrapropylammonium hydroxide were added into a beaker in sequence, and stirred continuously at room temperature for 24 h.

Subsequently, the solution was transferred into a Teflon-lined reaction kettle for a high-temperature crystallization at 160° C. for 72 h.

After the crystallization, the product was filtered, washed, dried, and calcined at 550° C. for 6 h, to obtain a sodium-based ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the HZSM-5 molecular sieve.

Comparative Example 2

This comparative example provides a ZSM-5 molecular sieve and HZSM-5 molecular sieve and a production method thereof. The production method of the ZSM-5 molecular sieve and the HZSM-5 molecular sieve comprises the following steps.

Under stirring, 0.5 g of aluminum nitrate nonahydrate, 68 g of deionized water, 90 g of silica sol, and 10.56 g of tetrapropylammonium hydroxide were added into a beaker in sequence, followed by warming up to 45° C. and aging for 24 h. After the aging, it was transferred into a polytetrafluoroethylene liner for a high-temperature crystallization at 120° C. for 72 h.

After the crystallization, the product was filtered, washed, dried, and calcined at 550° C. for 6 h, to obtain a sodium-based ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange three times, the product was filtered, washed, dried, and calcined at 550° C. for 4 h, to obtain the HZSM-5 molecular sieve.

Experimental Example

The HZSM-5 molecular sieve samples of Examples 1-5 and Comparative Examples 1-2 as described above are subjected to molding and test by specific steps as follows:

100 g of HZSM-5 molecular sieve sample and 100 g of pure water were stirred, and then 1 g of ethylene glycol was added as a dispersing aid. After stirring for 30 min, 15 g of polystyrene acrylate emulsion (45%) was added and stirred to form a uniform suspension. It was then spray-dried to form granules, and sieved to separate products of different particle sizes. The test results of product performance are shown in the following Table 1 and Table 2.

TABLE 1

| No. | HZSM-5 molecular sieve sample | Size range of sound-absorbing particles/μm | Static electricity Level | Initial ΔF0/Hz of sound-absorbing particles |
|---|---|---|---|---|
| Experimental Example 1 | Example 1 | 550-600 | 1 | 115 |
| Experimental Example 2 | Example 1 | 480-550 | 1 | 118 |
| Experimental Example 3 | Example 1 | 400-480 | 1 | 121 |
| Experimental Example 4 | Example 1 | 250-400 | 1 | 124 |
| Experimental Example 5 | Example 1 | 150-250 | 3 | 126 |
| Experimental Example 6 | Example 1 | 50-150 | 5 | 129 |

TABLE 2

| No. | Average particle size of HZSM-5 molecular sieve/μm | Initial ΔF0/Hz of sound-absorbing particles | ΔF0/Hz after VOCs of sound-absorbing particles |
|---|---|---|---|
| Example 1 | 1.4 | 124 | 96 |
| Example 2 | 1.1 | 123 | 87 |
| Example 3 | 0.79 | 125 | 76 |
| Example 4 | 1.83 | 121 | 97 |
| Example 5 | 2.35 | 117 | 95 |
| Comparative Example 1 | 0.28 | 96 | 43 |
| Comparative Example 2 | 4.62 | 107 | 63 |

It can be seen from the results in Tables 1 and 2 that the initial ΔF0 of the sound-absorbing particles increases with the decrease in particle size thereof. However, due to the physical and chemical properties of the powder itself, the smaller the particle size, the greater the static electricity on the particle surface, so the particles having a size range of 250-480 μm will have a suitable performance With the decrease of the particle size of HZSM-5 molecular sieve, the initial ΔF0 will increase to a certain extent, but the performance against VOCs will deteriorate accordingly. When the average particle size of HZSM-5 molecular sieve is less than 0.4 μm, due to the small particle size of HZSM-5 molecular sieve, the bulk density decreases accordingly, and the bulk density of the resulting sound-absorbing particles decreases, while the initial ΔF0 of the sound-absorbing particles decreases, and the performance against VOCs deteriorates. When the particle size is larger than 2 μm, the initial ΔF0 will be deteriorated accordingly. When the particle size of HZSM-5 molecular sieve is larger than 4 μm, the performance against VOCs will also be degraded. In the above, ΔF0 is difference of the F0 values in the impedance meter test, and the test for VOCs is carried out by subjecting a sample to a test for VOC adsorption at 120° C. for 4 h in a 250 mL closed space).

Example 6

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 7

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 12.6 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 80° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 8

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 85° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 9

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2.5 g of hemicellulose was added to the gel and stirred well, followed by warming up to 95° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 10

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 2 g of hemicellulose was added to the gel and stirred well, followed by warming up to 95° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Example 11

This example provides a hierarchical porous ZSM-5 molecular sieve and a hierarchical porous HZSM-5 molecular sieve and a production method thereof. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, 3 g of hemicellulose was added to the gel and stirred well, followed by warming up to 95° C. and aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Comparative Example 3

This example provides a hierarchical porous ZSM-5 molecular sieve and a hierarchical porous HZSM-5 molecular sieve and a production method thereof in which no hemicellulose was added. The production method of the hierarchical porous ZSM-5 molecular sieve and the hierarchical porous HZSM-5 molecular sieve comprises the following steps.

Under stirring, 90 g of silica gel (30% content), 10.15 g of tetrapropylammonium hydroxide, and 0.5 g of aluminum nitrate nonahydrate were added to 55 g of deionized water in sequence, stirred continuously at room temperature, and 1.2 g of NaOH was added to adjust it to pH of 9-11, to prepare a homogeneous gel.

Subsequently, the temperature was raised to 95° C. and allowed to aging for 3 h. After the aging, it was transferred into a polytetrafluoroethylene liner for a high-temperature crystallization at 180° C. for 72 h.

After the crystallization, the product was filtered, washed, dried, and calcined at 550° C. for 6 h, to obtain a sodium-based hierarchical porous ZSM-5 molecular sieve. Then, an ion exchange was carried out at 90° C. for 6 h by using 2 mol/L of $NH_4Cl$ solution, according to a proportion of 10 g of molecular sieve per 100 ml of the solution. After repeating the ion exchange for three times, the product was filtered, washed, dried, and calcined at 550° C. for 4 h, to obtain the hierarchical porous HZSM-5 molecular sieve.

Experimental Example

Figure 3:
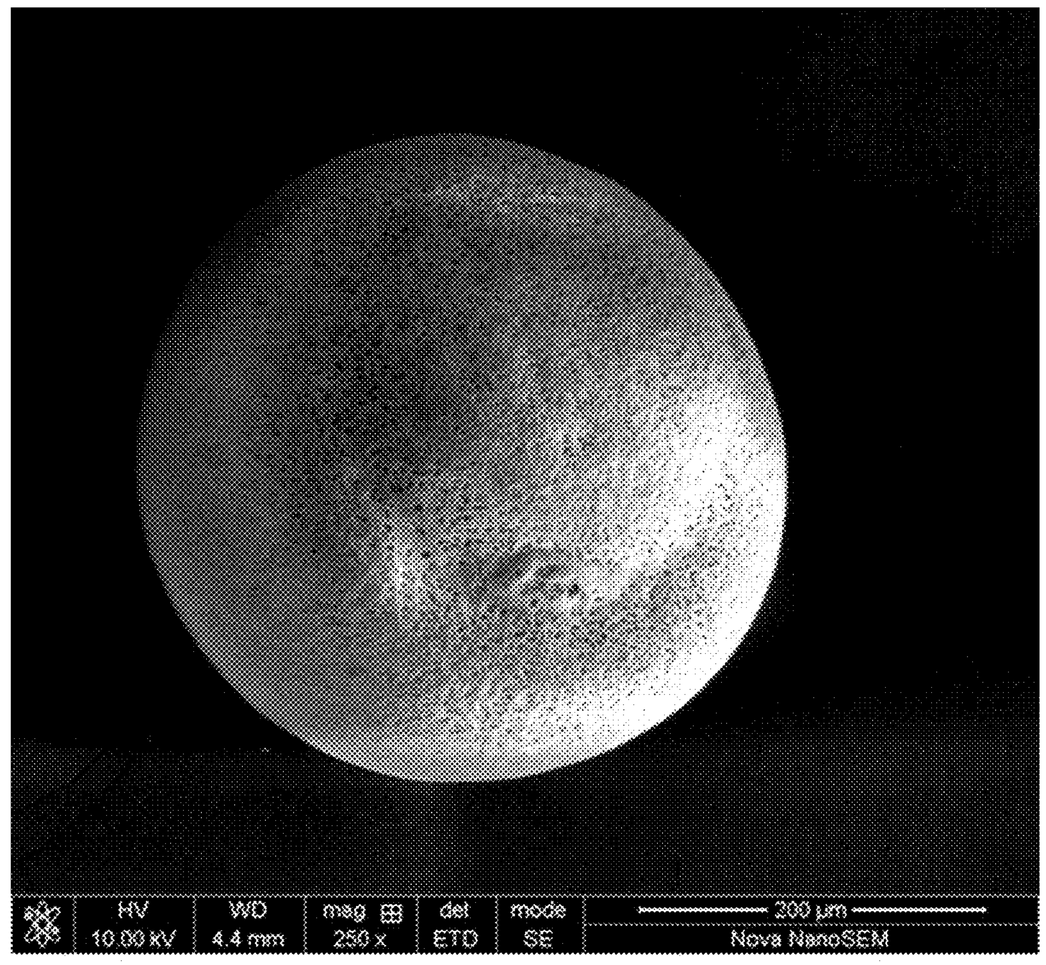
FIG. 3 is a SEM image of the sound-absorbing particles produced in Example 1 of the present invention.

The HZSM-5 molecular sieve samples of Examples 1 and 6-11 and Comparative Example 3 as described above are subjected to molding and test by the specific steps as follows:

100 g of HZSM-5 molecular sieve sample and 100 g of pure water were stirred, and then 1 g of ethylene glycol was added as a dispersing aid. After stirring for 30 min, 15 g of polystyrene acrylate emulsion (45%) was added and stirred to form a uniform suspension. It was then spray-dried to form granules, and sieved to separate products of suitable particle sizes. Here, since the particles formed by different HZSM-5 molecular sieves have substantially the same appearance, only the SEM image of Example 1 is shown, such as FIG. 3. Subsequently, they were loaded into a device for the acoustic performance test, and the results are shown in Tables 3 and 4.

TABLE 3

| No. | HZSM-5 molecular sieve sample/μm | Average pore size of micropores/nm | Average pore size of mesopores/nm | Average pore size/nm |
|---|---|---|---|---|
| Example 1 | 1.4 | 0.734 | 17.54 | 5.17 |
| Example 6 | 1.37 | 0.734 | 17.19 | 5.12 |
| Example 7 | 1.32 | 0.734 | 17.43 | 5.09 |
| Example 8 | 1.39 | 0.734 | 17.74 | 5.51 |
| Example 9 | 1.41 | 0.734 | 17.69 | 5.56 |
| Example 10 | 1.43 | 0.734 | 17.77 | 5.55 |
| Example 11 | 1.39 | 0.734 | 17.89 | 5.79 |
| Comparative Example 3 | 1.56 | 0.734 | 8.43 | 3.15 |

TABLE 4

| No. | Total pore volume/ (ml/g) | Pore volume of micropores/ (ml/g) | Initial ΔF0/Hz of sound-absorbing particles | ΔF0/Hz after VOCs of sound-absorbing particles |
|---|---|---|---|---|
| Example 1 | 0.237 | 0.137 | 121 | 96 |
| Example 6 | 0.245 | 0.145 | 123 | 93 |
| Example 7 | 0.242 | 0.147 | 124 | 87 |
| Example 8 | 0.249 | 0.144 | 119 | 95 |
| Example 9 | 0.253 | 0.141 | 120 | 102 |
| Example 10 | 0.249 | 0.145 | 123 | 100 |
| Example 11 | 0.251 | 0.139 | 122 | 105 |
| Comparative Example 3 | 0.205 | 0.172 | 120 | 57 |

As can be seen from the experimental results in Table 3, the particle size of the HZSM-5 molecular sieve will decrease with increasing the amount of tetrapropylammonium bromide as the template agent, the amount of which in Examples 1, 6, and 7 is gradually increased. This is because more templating agent favors nucleation and reduces the grain size. The average particle size of the HZSM-5 molecular sieve is gradually increased with the increase of the aging temperature, which is gradually increased in Examples 6, 8 and 9. In addition, the average particle size of HZSM-5 molecular sieve gradually decreases with the increase of the amount of hemicellulose, the amount of which in Examples 10, 9, and 11 is gradually increased. Meanwhile, since the micropores of molecular sieves are mainly determined by the template agent, the average pore sizes of the micropores in all Examples are more or less the same. Further, because the amount of template agent used, aging temperature, and amount of hemicellulose used will change the proportions of micropores and mesopores, the average pore size will be affected accordingly.

It can be seen from the experimental results in Tables 3 and 4 that the synthesized hierarchical porous HZSM-5 molecular sieve still has better acoustic improvement performance than the comparative sample after being tested by VOCs. In particular, by increasing the amount of tetrapropylammonium bromide, which is gradually increased in Examples 1, 6 and 7, the micropores of the synthesized HZSM-5 molecular sieves are increased while the mesopores are decreased, which will make the resistance against VOCs of the sound-absorbing particles degraded to a certain extent. In addition, by increasing the amount of hemicellulose, which is 0 in Comparative Example 3, and gradually increased in Examples 10, 9 and 11, the micropores of the synthesized HZSM-5 molecular sieves are reduced while the mesopores are increased, which will improve the resistance against VOCs of the sound-absorbing particles to a certain extent. Further, by increasing the aging temperature, which is gradually increased in Examples 6, 8 and 9, the micropores of the synthesized HZSM-5 molecular sieves are reduced while the mesopores are increased, which will improve the resistance against VOCs of the sound-absorbing particles to a certain extent. In addition, since the stability of the resistance against VOCs of the sound-absorbing particles is significantly improved by the prepared hierarchical porous HZSM-5 molecular sieve, the sound-absorbing particles can maintain an excellent acoustic low-frequency response.

The above descriptions are only specific embodiments of the present invention, but the protection scope of the present invention is not limited thereto. Simple changes or replacements made by any person skilled in the art who is familiar with the technical field on basis of the technical solutions and concepts of the present invention should be included within the protection scope of the present invention.

The invention claimed is:

1. A loudspeaker comprising a back cavity loaded with a hierarchical porous molecular sieve sound-absorbing material, wherein the hierarchical porous molecular sieve sound-absorbing material comprises a hierarchical porous ZSM-5 molecular sieve, wherein the hierarchical porous ZSM-5 molecular sieve comprises micropores having a pore size of 0.5-1.8 nm and mesopores having a pore size of 10-28 nm, and the molecular sieve has a particle size of 0.3-4 μm;

wherein the hierarchical porous ZSM-5 molecular sieve has a total pore volume of 0.23-0.26 ml/g, and the micropores have a pore volume of 0.12-0.16 ml/g.

2. The loudspeaker according to claim 1, wherein the micropores have a pore size of 0.6-1.5 nm, and the hierarchical porous ZSM-5 molecular sieve has a particle size of 0.7-3 μm.

3. A loudspeaker comprising a back cavity loaded with a hierarchical porous molecular sieve sound-absorbing material, wherein the hierarchical porous molecular sieve sound-absorbing material comprises a hierarchical porous HZSM-5 molecular sieve, wherein the hierarchical porous HZSM-5 molecular sieve obtained by subjecting a hierarchical porous ZSM-5 molecular sieve to an ion exchange in a $NH_4Cl$ solution, and drying and calcining the product;

wherein the hierarchical porous ZSM-5 molecular sieve comprises micropores having a pore size of 0.5-1.8 nm and mesopores having a pore size of 10-28 nm, and the molecular sieve has a particle size of 0.3-4 μm;

wherein the hierarchical porous ZSM-5 molecular sieve has a total pore volume of 0.23-0.26 ml/g, and the micropores have a pore volume of 0.12-0.16 ml/g.

4. The loudspeaker according to claim 3, wherein the $NH_4Cl$ solution has a concentration of 1-2 mol/L.

5. The loudspeaker according to claim 3, wherein the ion exchange is repeated 1-3 times, and for 3-6 h each time.

6. The loudspeaker according to claim 3, wherein 5-10 g of the hierarchical porous ZSM-5 molecular sieve is used per 100 ml of the $NH_4Cl$ solution.

7. The loudspeaker according to claim 3, wherein the ion exchange is performed at a temperature of 60° C.-100° C.

8. The loudspeaker according to claim 3, wherein the calcination after the ion exchange is performed at a temperature of 500° C.-600° C. for 3-6 h.

* * * * *